US009140965B2

(12) United States Patent  (10) Patent No.: US 9,140,965 B2
Dennis et al.  (45) Date of Patent: Sep. 22, 2015

(54) IMMERSIVE PROJECTION SYSTEM

(71) Applicant: Cubic Corporation, San Diego, CA (US)

(72) Inventors: James Dennis, Orlando, FL (US); Ronald Allen, Orlando, FL (US); John Lewis, Orlando, FL (US); Robert Hoppenfeld, Orlando, FL (US)

(73) Assignee: Cubic Corporation, San Diego, CA (US)

(*) Notice: Subject to any disclaimer, the term of this patent is extended or adjusted under 35 U.S.C. 154(b) by 235 days.

(21) Appl. No.: 13/682,018

(22) Filed: Nov. 20, 2012

(65) Prior Publication Data

US 2013/0128231 A1    May 23, 2013

Related U.S. Application Data

(60) Provisional application No. 61/562,751, filed on Nov. 22, 2011.

(51) Int. Cl.
*G03B 21/28* (2006.01)
*G03B 21/14* (2006.01)
*G03B 21/22* (2006.01)
*G03B 37/04* (2006.01)
*G03B 21/58* (2014.01)
*G03B 21/62* (2014.01)
*G03B 21/00* (2006.01)
*G03B 21/56* (2006.01)
*G03B 21/585* (2014.01)

(52) U.S. Cl.
CPC .............. *G03B 21/14* (2013.01); *G03B 21/00* (2013.01); *G03B 21/28* (2013.01); *G03B 21/56* (2013.01); *G03B 21/58* (2013.01); *G03B 21/62* (2013.01); *G03B 37/04* (2013.01); *G03B 21/585* (2013.01)

(58) Field of Classification Search
CPC ............................ G03B 21/58; G03B 231/585
USPC .............. 353/98, 99, 74, 77, 78, 79, 119, 10, 353/122; 434/284, 285, 287, 69; 352/69, 352/70; 248/317–344
See application file for complete search history.

(56) References Cited

U.S. PATENT DOCUMENTS 6,905,218 B2 * 6/2005 Courchesne .................. 353/122
7,604,354 B1 * 10/2009 Ligon ............................. 353/30

(Continued)

FOREIGN PATENT DOCUMENTS

WO       98/49599 A1    11/1998
WO       00/10055 A1     2/2000
WO    2013/076280 A8     5/2013

OTHER PUBLICATIONS

International Search Report and Written Opinion mailed Jul. 11, 2013. PCT/US2012/066218, 14 pages.

*Primary Examiner* — William C Dowling
*Assistant Examiner* — Ryan Howard
(74) *Attorney, Agent, or Firm* — Kilpatrick Townsend & Stockton LLP

(57) ABSTRACT

In one example arrangement, an immersive projection system includes an enclosure, and a number of projectors suspended outside and near the upper portion of the enclosure. The projectors project portions of a scene through openings in the enclosure and onto an inside surface of the enclosure. In some embodiments, light emanating from the projectors reflects from one or more mirrors before being cast onto the enclosure wall. The projectors and one or more mirrors may be mounted to a mounting frame that maintains the projectors and one or more mirrors in fixed spatial relationship, and the mounting frame may be mounted on a movable gantry for lifting the mounting frame to the upper portion of the enclosure. The enclosure may be a collapsible dome.

21 Claims, 12 Drawing Sheets

(56) References Cited

U.S. PATENT DOCUMENTS

| | | | |
|---|---|---|---|
| 2003/0169406 A1* | 9/2003 | Ben-Ari | 353/28 |
| 2006/0114171 A1 | 6/2006 | Vascotto et al. | |
| 2007/0146649 A1* | 6/2007 | Daniel et al. | 353/99 |
| 2008/0192213 A1* | 8/2008 | Johnson et al. | 353/119 |
| 2010/0007949 A1* | 1/2010 | Clawson et al. | 359/443 |
| 2010/0300006 A1 | 12/2010 | Magpuri | |
| 2011/0157694 A1 | 6/2011 | Ferren et al. | |

* cited by examiner

IMMERSIVE PROJECTION SYSTEM

CROSS-REFERENCES TO RELATED APPLICATIONS

This application claims priority to provisional U.S. Patent Application 61/562,751, filed Nov. 22, 2011 and titled "Immersive Projection System", the entire disclosure of which is hereby incorporated by reference herein for all purposes.

BACKGROUND OF THE INVENTION

Immersive viewing environments are useful in a variety of applications, including entertainment, gaming, military and civilian training, or other kinds of training. In an immersive viewing system, a user may be surrounded or substantially surrounded by a projection screen that displays a representation of an environment, and the user has the impression of being immersed in the environment. In some systems, the scene may be an immersive motion picture. Some systems are interactive, so that the user can navigate through the environment, with the scene automatically updating to reflect simulated motion through the displayed environment.

Prior immersive viewing systems have disadvantages. For example, systems may require a large number of projectors to cover the entire projection screen. In some systems, the environment representation is formed by a number of projectors, each displaying part of the scene on the viewing screen. In such systems, the user can only move in a very limited part of the enclosed area without casting shadows on the viewing screen. Prior systems are also difficult and time consuming to set up.

BRIEF SUMMARY OF THE INVENTION

According to one aspect, an immersive projection system includes an enclosure having a perimeter wall and a top portion, and a set of projectors suspended outside the enclosure at the top portion of the enclosure. The projectors are configured to project imagery through openings in the perimeter wall and onto an inside surface of the perimeter wall. The enclosure may be a collapsible dome. In some embodiments, when deployed, the dome approximately defines a portion of a sphere. In some embodiments, the imagery forms a continuous scene representation surrounding a center portion of the enclosure. In some embodiments, the shape of the enclosure is maintained by positive air pressure within the collapsible dome, such that the perimeter wall defines the dome shape. The shape of the enclosure may be maintained in part by negative air pressure within the enclosure as compared with the atmosphere outside the enclosure. In some embodiments, the set of projectors includes no more than five projectors. In some embodiments, the set of projectors comprises a plurality of projectors, each projector aimed inward toward a central axis, and light emanated by the projectors falls directly onto the perimeter wall. In some embodiments, the set of projectors comprises a plurality of projectors, each projector aimed inward toward a central axis; the immersive projection system further comprises one or more mirrors suspended in the upper portion of the enclosure at the central axis; and light emanated by each projector reflects from one of the one or more mirrors before being cast onto the perimeter wall. In some embodiments, the one or more mirrors consist of only a single spherical mirror. In some embodiments, the one or more mirrors comprise one and only one convex mirror face for each projector. Each convex mirror face may define a segment of a sphere. Each convex mirror face may be aspheric. In some embodiments, the immersive projection system further comprises a mounting frame onto which the plurality of projectors is mounted, the mounting frame holding the plurality of projectors in fixed spatial relationship. The immersive projection system may further comprise a movable gantry to which the mounting frame is attached, the gantry configured to raise the mounting frame from a position facilitating assembly of the system to position at the upper portion of the enclosure. In some embodiments, the immersive projection system further comprises one or more mirrors mounted to the mounting frame, wherein light emanated by each projector reflects from one of the one or more mirrors before being cast onto the perimeter wall, and wherein the mounting frame holds the plurality of projectors and the one or more mirrors in fixed spatial relationship.

According to another aspect, a structure for supporting one or more projectors in an immersive projection system comprises at least two towers, a gantry suspended between the two towers and movable vertically, and a mounting frame affixed to the gantry. The mounting frame comprises mounting points for mounting one or more projectors. In some embodiments, the structure further comprises one or more mirrors fixed to the mounting frame such that projectors mounted to the mounting points aim toward the one or more mirrors. The gantry may be movable from a position facilitating assembly of the system to a position at the upper portion of the enclosure. In some embodiments, the structure further comprises the one or more projectors, and an enclosure having a perimeter wall, the enclosure being collapsible, wherein an upper portion of the perimeter wall is configured to be raised by the raising of the gantry.

According to another aspect, a method of assembling a projection system comprises the steps of erecting two towers, connecting a movable gantry between the two towers, positioning the movable gantry at a height that facilitates assembly of the system, and affixing a mounting frame to the movable gantry. The mounting frame includes mounting points for one or more projectors. The method further includes mounting one or more projectors to the mounting points, and raising the gantry to its working height. In some embodiments, the method further comprises connecting an upper portion of a perimeter wall of an enclosure to the mounting frame such that each of the one or more projectors projects imagery through a respective opening in the perimeter wall, and such that raising the gantry raises the upper portion of the perimeter wall to its working height. The method may further include pressurizing the enclosure.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments.

Figure 1:
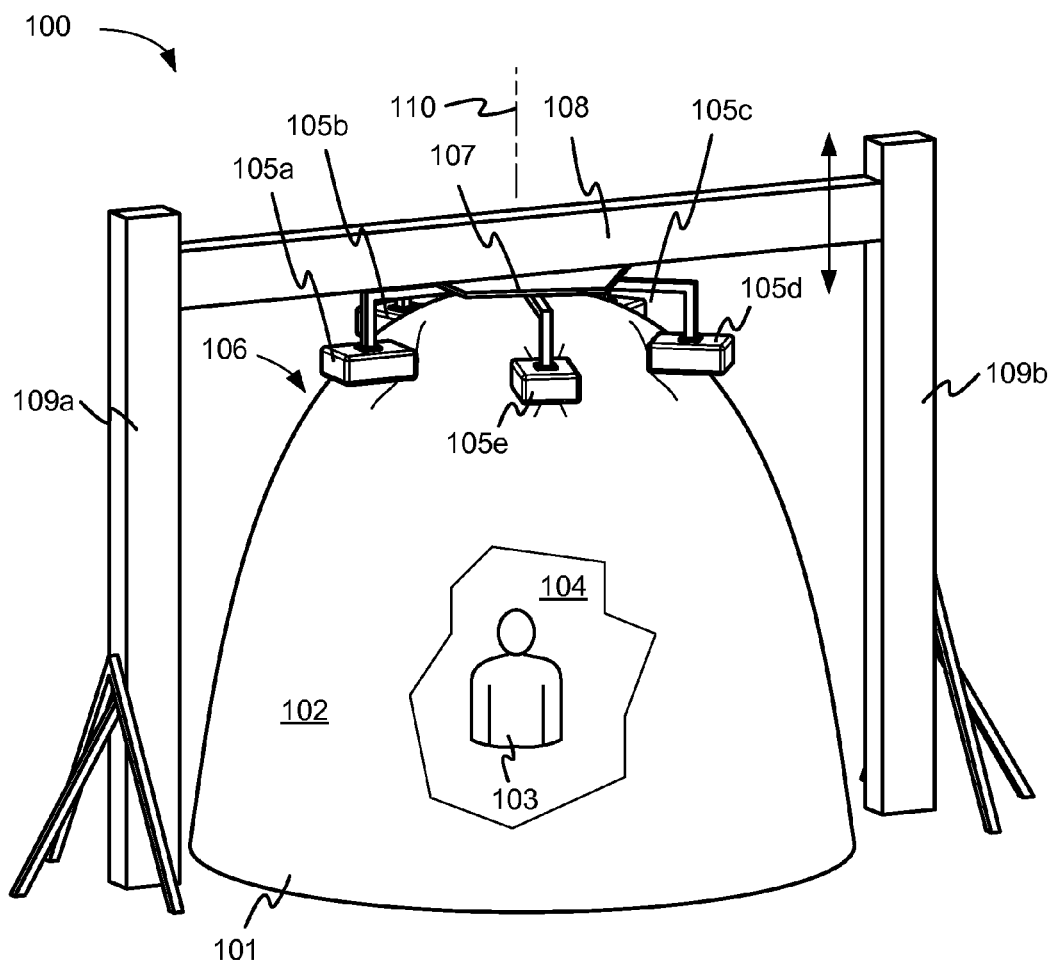
FIG. 1 is an external view of an immersive projection system, in accordance with an embodiment.

FIG. 1 is an external view of an immersive projection system 100, in accordance with an embodiment. The system includes an enclosure 101 that includes a perimeter wall 102, which surrounds a user 103. Perimeter wall 102 has an inside surface 104, and a set of projectors 105a-105e projects imagery onto inside surface 104, through openings in perimeter wall 102. Preferably, the images projected by projectors 105a-105e are coordinated and create a seamless 360-degree representation of an environment, so that user 103 has the experience of being immersed in the environment. While the system illustrated in FIG. 1 completely surrounds user 103, the principles of the invention may be embodied in systems that only partially surround the user.

Enclosure 101 also includes a top portion 106, and projectors 105a-105e are positioned at top portion 106, so that user 103 has freedom of movement within a relatively large portion of enclosure 101 without casting shadows on inner surface 104 by interrupting the projection of light from projectors 105a-105e.

In some embodiments, enclosure 101 may be made of a collapsible material, for example a cloth or other flexible material. Enclosure 101 may be fabricated in such a way that any seams are unobtrusive, so as to minimize their tendency to distract from the immersive experience. For example, a fabric enclosure 101 may be pieced from segments that are precisely cut and joined by laser stitching, heat welding, an adhesive, or another technique that results in unobtrusive joints between dome segments.

The dome shape of enclosure 101 may be maintained by pressurizing the interior of enclosure 101 using a fan or other air source, not shown. The lower perimeter of enclosure 101 may be weighted to hold enclosure 101 against the floor when inflated. In other embodiments, enclosure 101 may include a supporting frame and the interior of enclosure 101 may be held at a negative pressure with respect to the atmosphere outside the enclosure, so that the dome shape is maintained by the frame and the negative air pressure.

In the embodiment pictured in FIG. 1, projectors 105a-105e are mounted on a mounting frame 107, which maintains the projectors in a fixed spatial relationship. In the embodiment of FIG. 1, projectors 105a-105e are aimed inward toward a central axis 110. Mounting frame 107 is in turn mounted on a gantry 108, which is movable vertically along towers 109a and 109b. The vertical movement may be accomplished by any suitable mechanism, for example a crank and pulley system, a leadscrew, or other mechanism, and may be manually operated or motorized.

The gantry system and collapsible dome combine to enable system 100 to be set up quickly and easily. For example, the components of system 100 may be shipped to a usage site, and towers 109a and 109b and gantry 108 assembled. Gantry 108 may be placed at a low level, for example ground level or waist height, so that assemblers can attach mounting frame 107, projectors 105a-105e, and collapsible perimeter wall 102. Gantry 108 can then be raised and enclosure 101 inflated to complete the mechanical setup of the system. Various electrical connections will also be made, as described in more detail below.

One of the advantages of system 100 is that projectors 105a-105e may be changed easily. For example, a particular installation may be upgraded to projectors having higher resolution by changing the projectors, while the other mechanical parts of the system remain the same. Different projectors may simply be attached to mounting points on mounting frame 107. Or different installations may use different projectors, for example to meet different cost or performance targets. Any suitable projectors may be utilized, but one example of a suitable projector for some embodiments is a model F35 projector with RGB VizSim color wheel and a resolution of 2560×1600 pixels, available from projectiondesign a/s of Fredrikstad, Norway.

Figure 2:
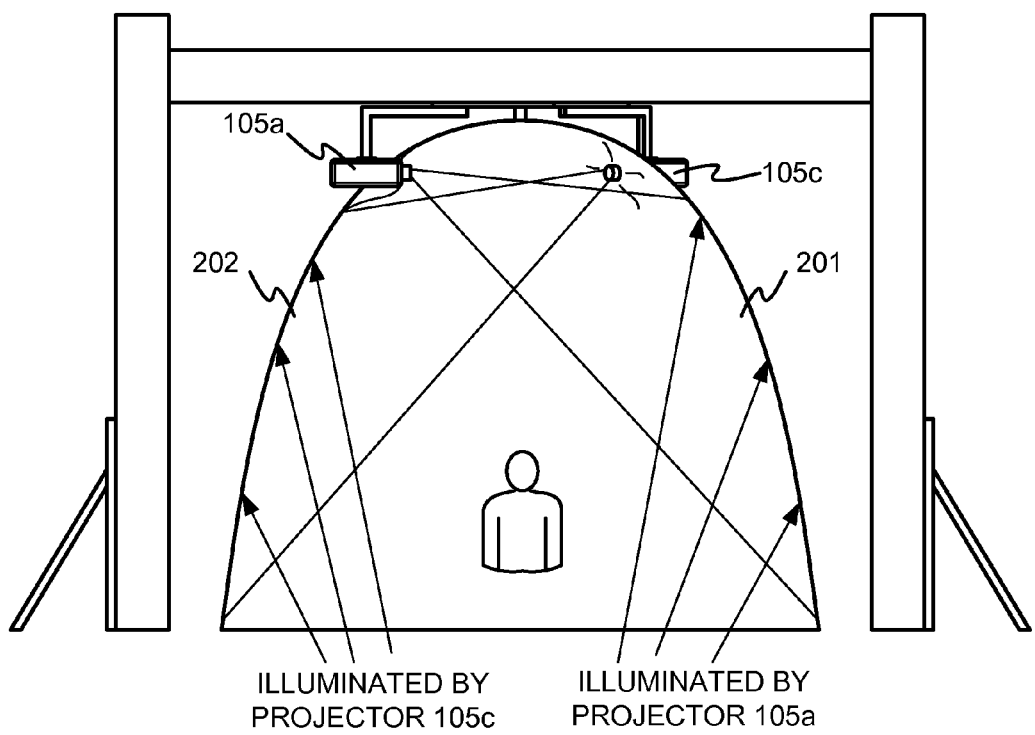
FIG. 2 shows an orthogonal cutaway view of the system of FIG. 1.

In some embodiments, projectors 105a-105e project directly onto opposing portions of inner surface 104. FIG. 2 shows an orthogonal cutaway view of system 100 according to this arrangement. Only projectors 105a and 105c are shown in this view for clarity. Inner surface portion 201 is illuminated by projector 105a, and inner surface portion 202 is illuminated by projector 105c. The view of FIG. 2 is simplified, and does not depict the full areas illuminated by the projectors. Other projectors illuminate other parts of inner surface 104, so that a complete 360-degree view is created. The areas illuminated by adjacent projectors may overlap.

While system 100 includes five projectors 105a-105c, more or fewer projectors may be utilized.

Figure 3:
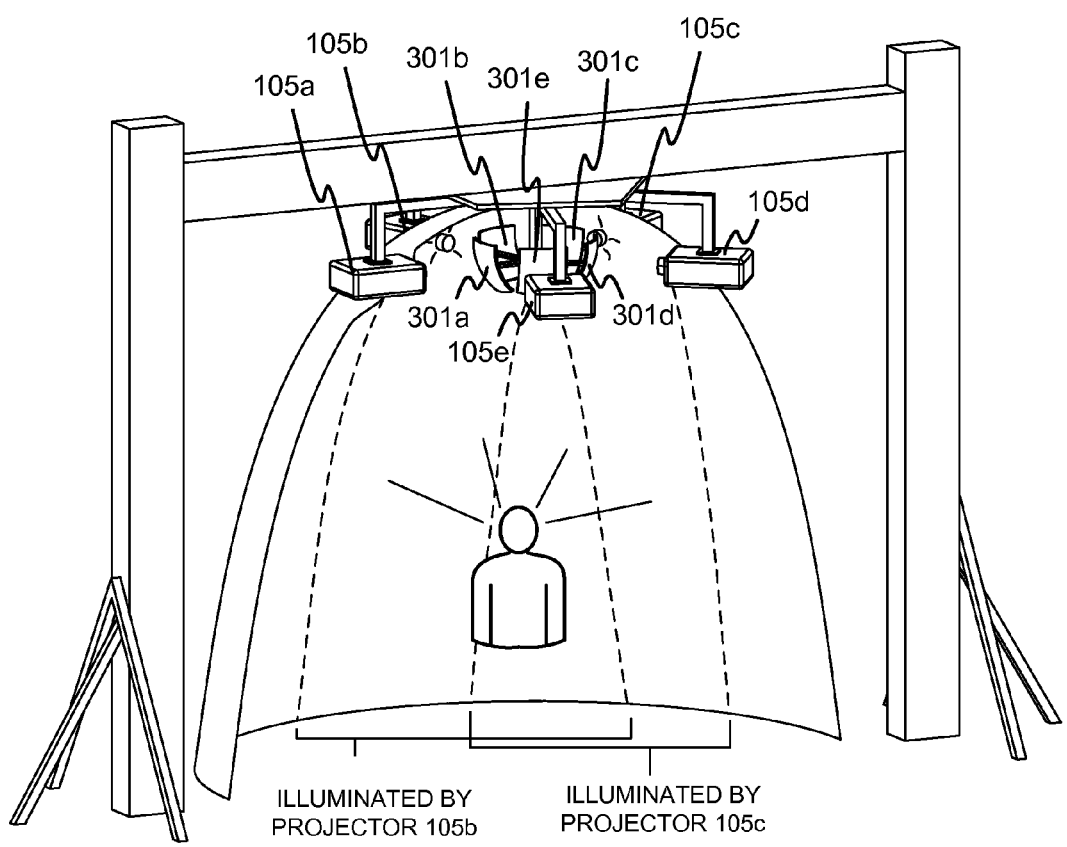
FIG. 3 shows an oblique cutaway view of another embodiment.
Figure 4:
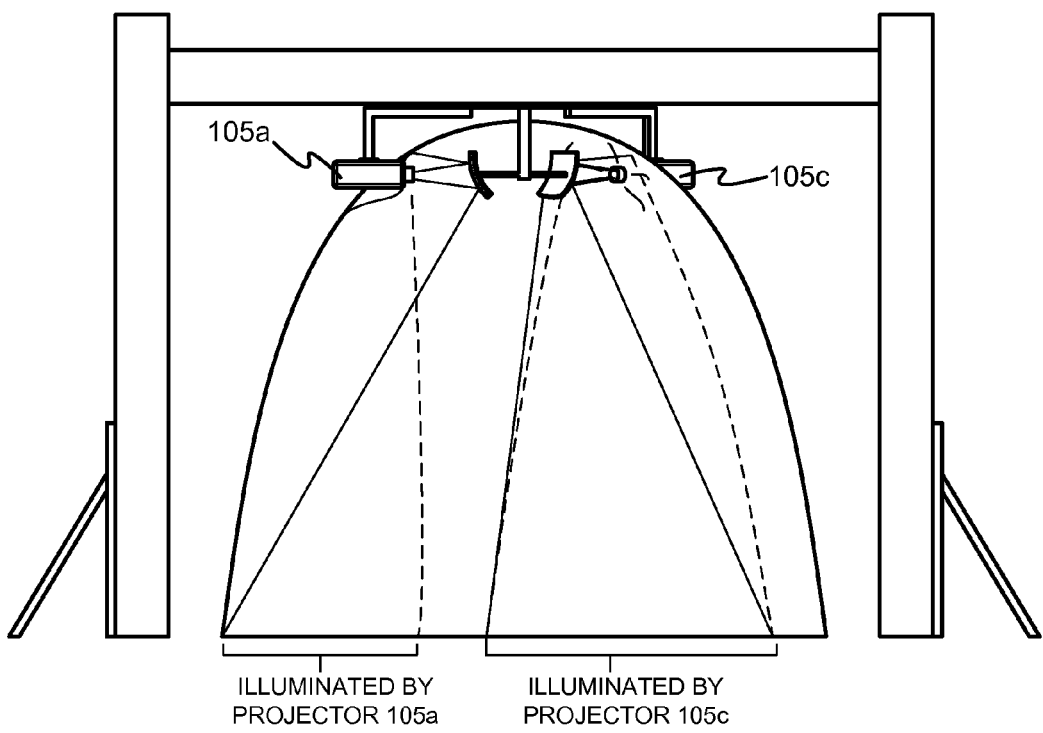
FIG. 4 shows an orthogonal view of the system of FIG. 3, illustrating the parts of the inner enclosure surface illuminated by certain projectors.

FIG. 3 shows an oblique cutaway view of another embodiment. In this embodiment, mirrors 301a-301e are positioned in front of projectors 105a-105c. Light from each projector 105a-105e is reflected from its corresponding mirror 301a-301e, and illuminates a portion of interior surface 204 near the respective projector. FIG. 4 shows an orthogonal view of the system of FIG. 3, illustrating the parts of inner surface 104 illuminated by projectors 105a and 105c. The illuminated areas shown in FIGS. 3 and 4 are schematic only, and may not reflect exact shapes of illuminated areas. In practice, the shapes of the areas illuminated by the projectors will depend on the shape of the enclosure wall, the shapes of mirrors 301a-301e, and other factors. This embodiment, using mirrors in front of the projectors, may increase the available volume within enclosure 101 for movement of the user, as compared with the embodiment of FIG. 2. The shape of each mirror is selected for good optical performance of the system, and may depend on the shape of enclosure 101. In some embodiments, each of mirrors 301a-301e is convex. For example, the front surface of each of mirrors 301a-301e may be a portion of a sphere, although aspheric shapes can also be used.

Figure 5:
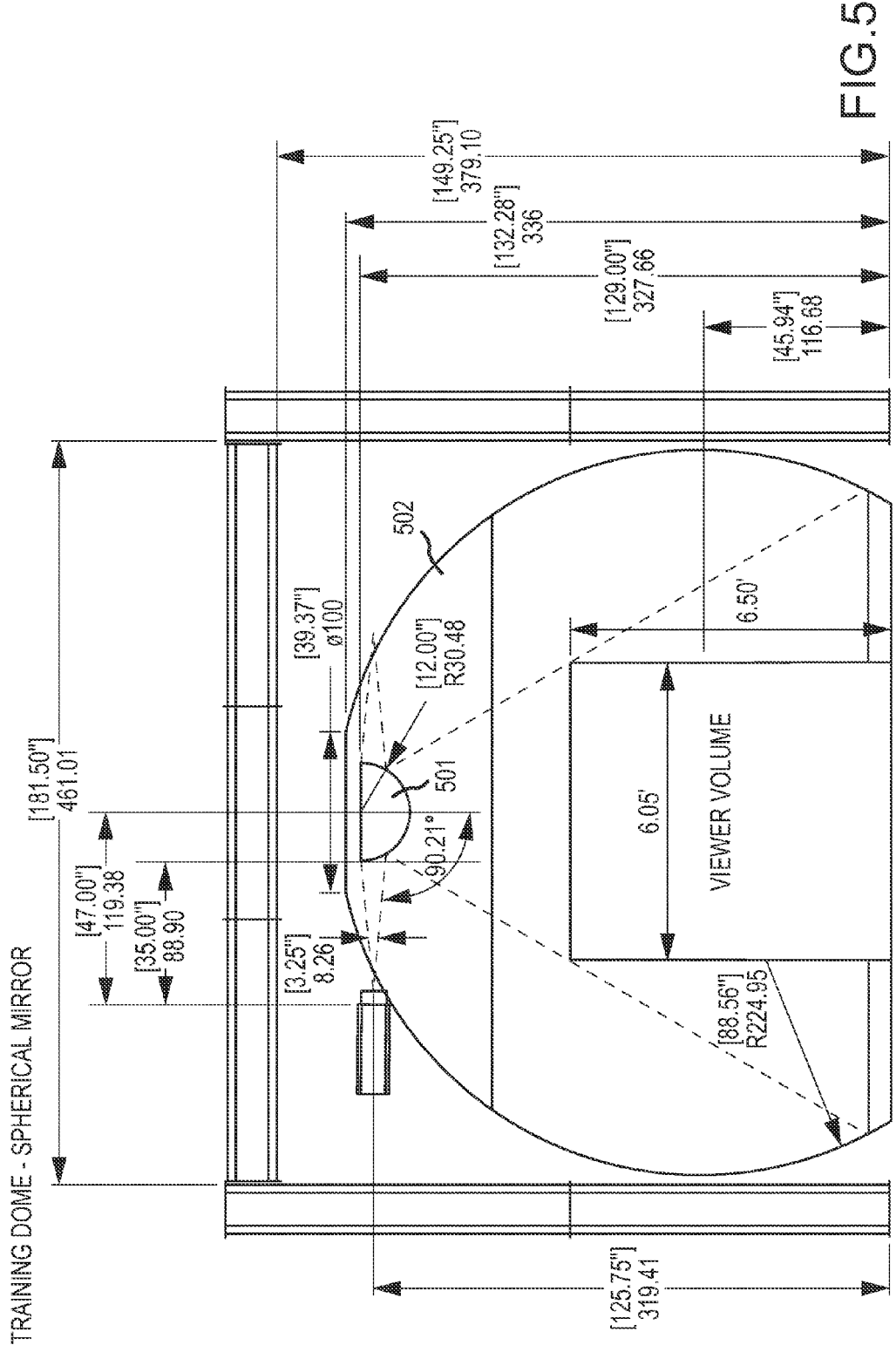
FIG. 5 illustrates a cross section view of an embodiment using a mirror that defines a portion of a sphere.

While the embodiment of FIGS. 3 and 4 uses one mirror per projector, other arrangements are possible. For example, a single spherical mirror may be used, and light from all of the projectors may reflect from different portions of the single spherical surface. Here, "spherical" means that the mirror surface defines at least a portion of a sphere, but a "spherical" mirror need not define a complete sphere. FIG. 5 illustrates a cross section view of an embodiment using a mirror 501 that defines a portion of a sphere, and is therefore considered to be spherical. In the example of FIG. 5, enclosure 502 also approximately defines a portion of a sphere. Other mathematically-definable enclosure shapes are possible as well.

Figure 6:
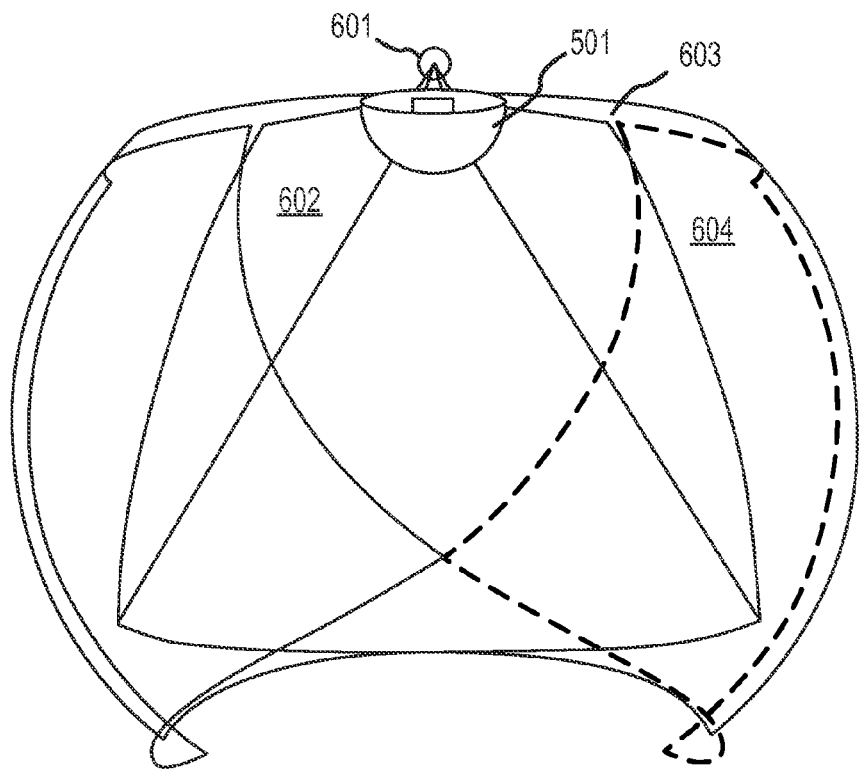
FIG. 6 illustrates how the areas illuminated by different projectors in the embodiment of FIG. 5 overlap.

FIG. 6 illustrates how the areas illuminated by different projectors in the embodiment of FIG. 5 overlap. In FIG. 6, only one projector 601 is shown, reflecting light from spherical mirror 501, illuminating area 602 on interior surface 603. Another projector (not shown) may illuminate area 604, shown outlined in dashed lines. While FIG. 6 may be a more accurate depiction of the illuminated areas and their overlap for a particular configuration of mirror 501 and surface 603, it is still only exemplary, and other particular configurations may include illuminated regions having somewhat different shapes than those shown in FIG. 6.

Figure 7:
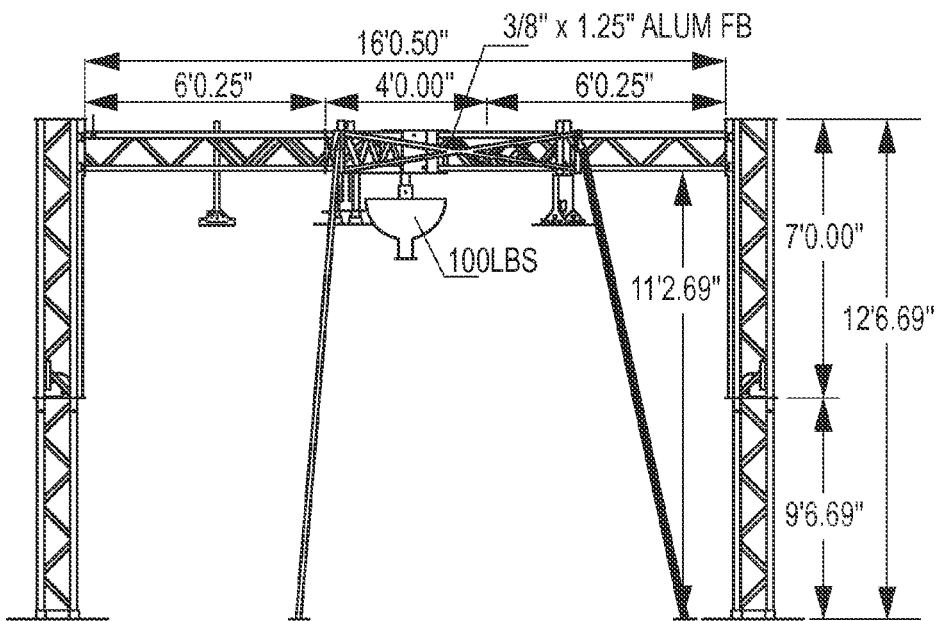
FIG. 7 is a front view of a structure of an immersive projection system according to an embodiment.
Figure 8:
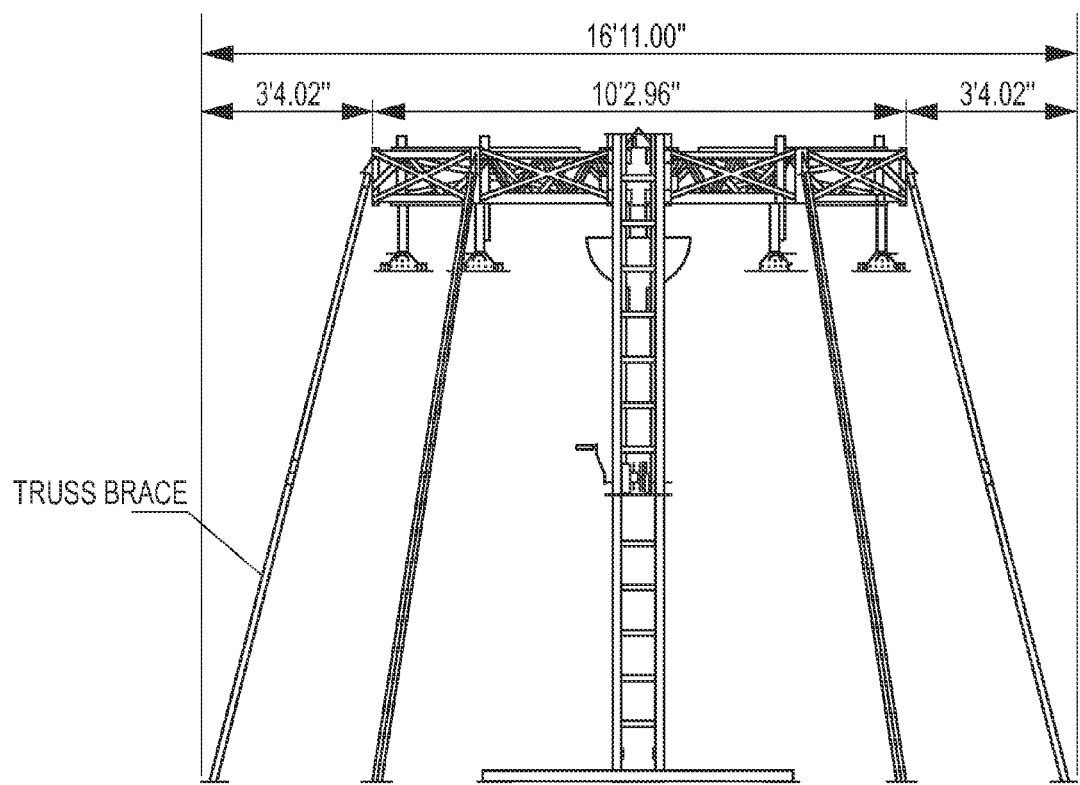
FIG. 8 is a side view of the structure of FIG. 7.
Figure 9:
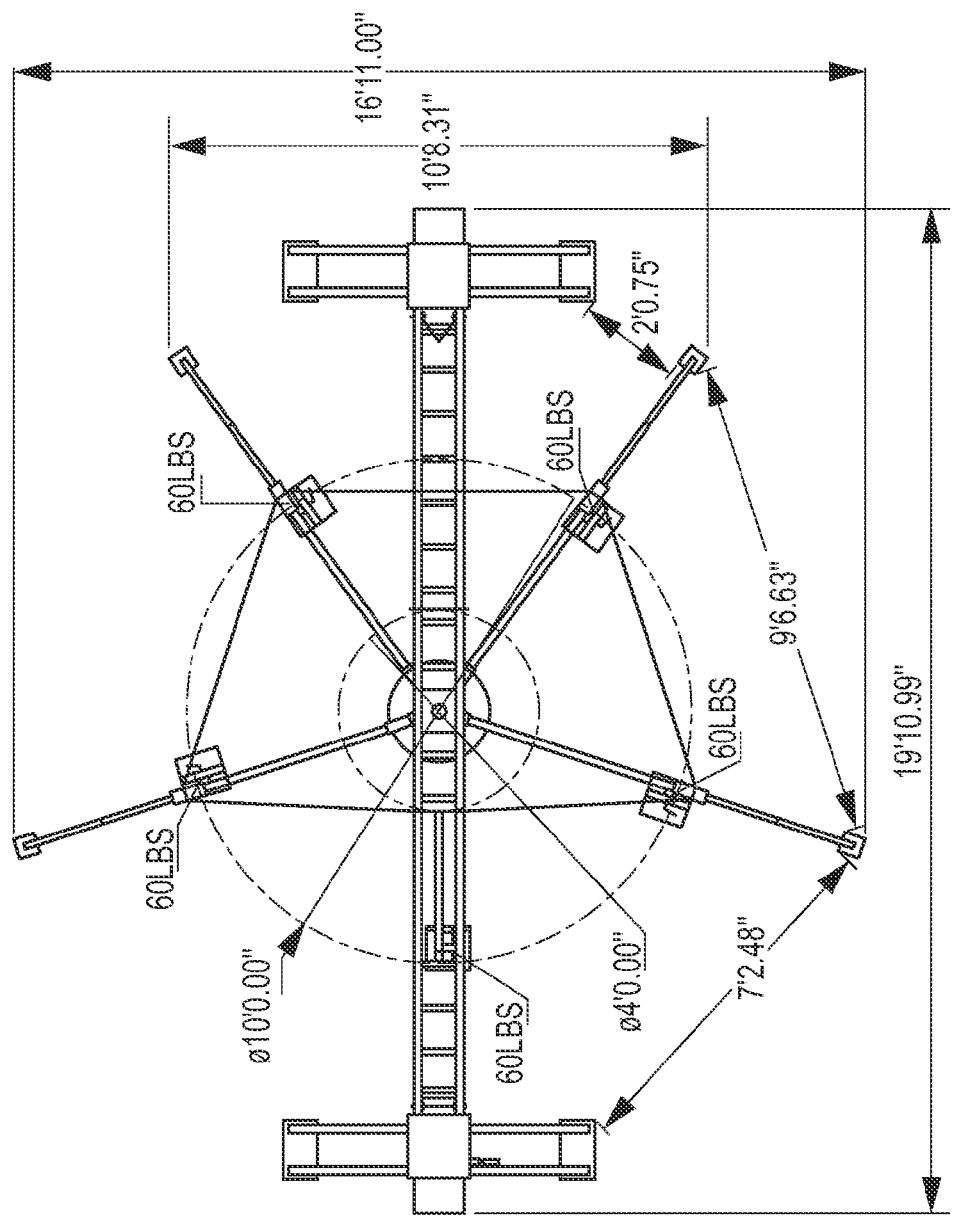
FIG. 9 is a top view of the structure of FIG. 7.
Figure 10:
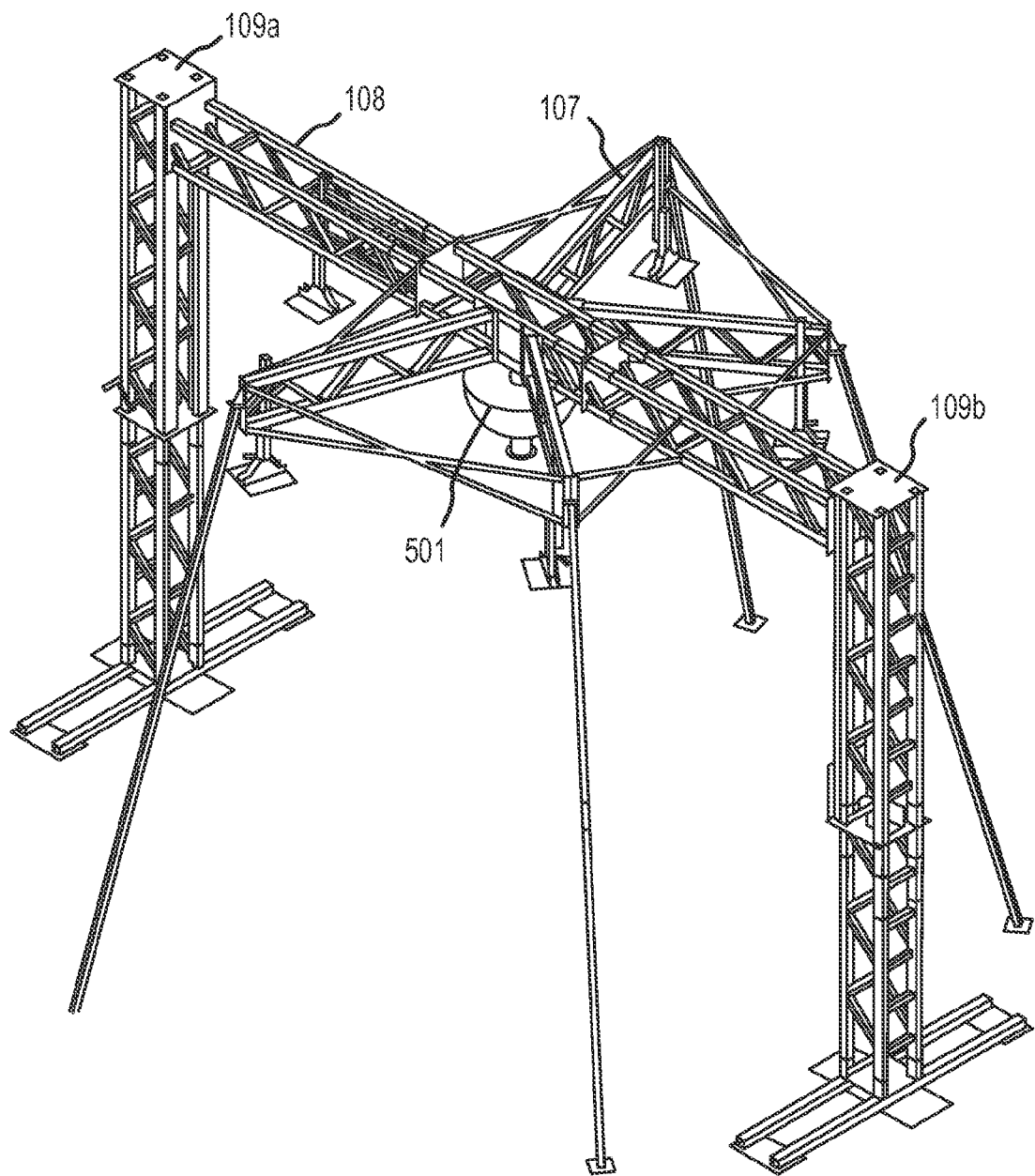
FIG. 10 is an oblique view of the structure of FIG. 7.

FIGS. 7-10 depict a particular embodiment of a structure for supporting a mirror, projectors, and an enclosure, although the projectors and enclosure itself are not shown. FIG. 7 is a front view, FIG. 8 is a side view, and FIG. 9 is a top view of the structure. FIG. 10 shows an oblique view. Referring to FIG. 10, mirror 501, mounting frame 107, gantry 108, and towers 109a and 109b are visible.

Figure 11:
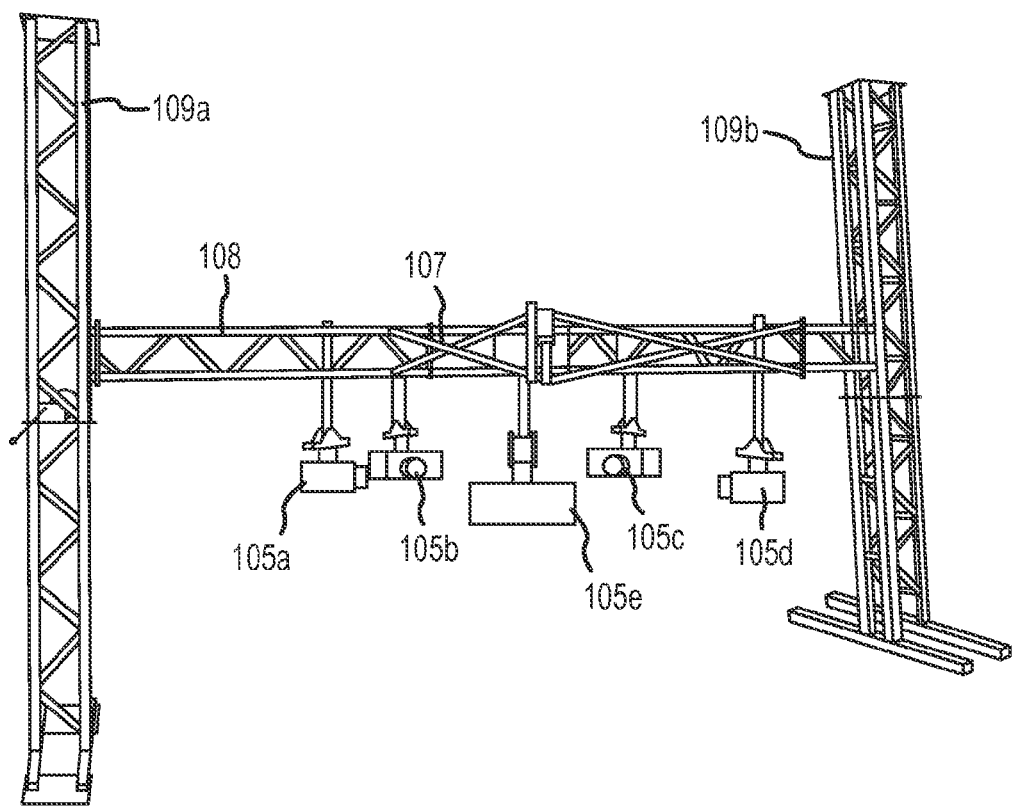
FIG. 11 shows one example installation of a portion of an immersive projection system according to embodiments, at an intermediate stage of assembly.
Figure 12:
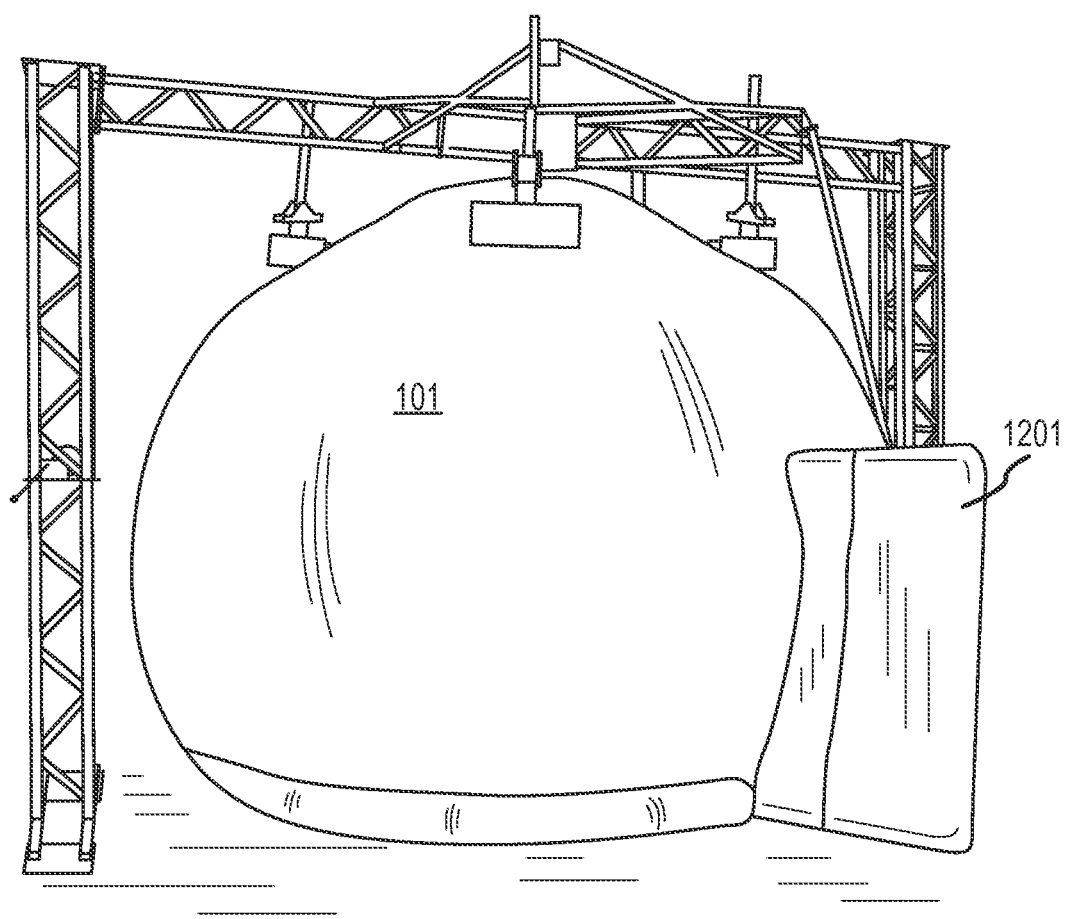
FIG. 12 shows the system of FIG. 11 in a later stage of assembly.

FIG. 11 shows one example installation of a portion of an immersive projection system according to embodiments, at an intermediate stage of assembly. In this stage, gantry 108 is held at about head level, and projectors 105a-105b have been attached to mounting frame 107. In other embodiments, the system may position the gantry at other heights convenient for assembly, for example floor level or waist level. The capability to lower projectors 105a-105b to a convenient working height greatly simplifies the setup of the system. FIG. 12 shows the system with enclosure 101 installed, and gantry 108 raised to its working height. FIG. 12 also shows an example entrance and egress port 1201 providing access to the interior of enclosure 101.

Figure 13:
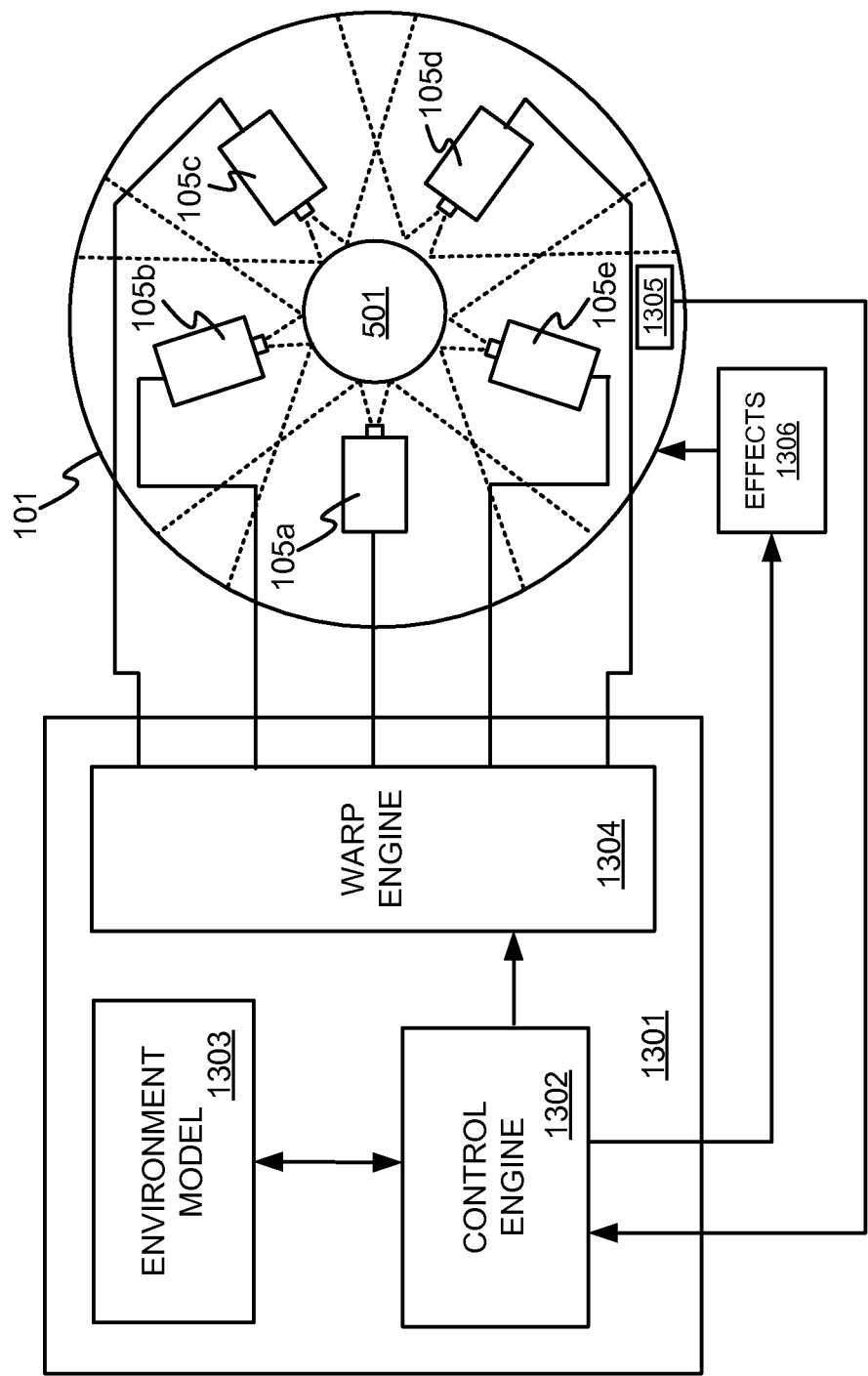
FIG. 13 illustrates an electronic architecture of the system, according to one embodiment.

FIG. 13 illustrates an electronic architecture of the system, according to one embodiment. A computerized controller 1301 coordinates operation of the system. A control engine 1302 interacts with an environment model 1303 to determine where a user of the system is virtually positioned within a computer generated environment. Environment model 1303 may include, for example, a digitized description of a simulation environment, and logic or software to provide images of the environment from different vantage points. Control engine determines from the user's virtual position what imagery should be projected on enclosure 101 by each of projectors 105a-105b. This information is fed to warp engine 1304, which pre-distorts the selected imagery so that, given the particular projectors in use, the shape of mirror 501, the shape of enclosure 101, and the projected image overlap, the resulting projected images will appear correct and undistorted to the user after projection onto enclosure 101.

Various sensors 1305 may be provided within enclosure 101. For example, sensors 1305 may include simulated controls for an airplane. When the user actuates the simulated controls, control engine 1302 models how the simulated airplane would react, determines the trajectory of the airplane within the model environment, obtains the corresponding imagery from environment model 1303, and provides that information to warp engine 1304. Warp engine 1304 computes new pre-distorted imagery and feeds it to projectors 105a-105e for projection on enclosure 101. With the projected imagery updated, the user has the perception that the "airplane" he or she is flying reacted in a realistic way to his or her control inputs. In another example, sensors 1305 may include a treadmill that measures travel of the user as the user "walks" through the simulated environment, so that the projected imagery can be updated to reflect the user's simulated movements. Many other kinds of sensors may be utilized.

In other embodiments, controller 1301 may simply replay previously-recorded content for viewing by a user 103. For example, the previously-recorded content may be an immersive motion picture.

Control engine 1302 may also be able to cause certain other special effects 1306 to occur within enclosure 101. For example, the temperature within enclosure 101 could be changed to correspond to changes in the simulated environment, or odors may be injected within enclosure 101.

The functions of computerized controller 1301 may be performed by a suitably programmed computer system, which may include one or more computers, programs, storage systems, networks, interfaces, and other devices, which may be co-located or widely distributed.

While the principles of the disclosure have been described above in connection with specific apparatuses and methods, it is to be clearly understood that this description is made only by way of example and not as limitation on the scope of the disclosure.

What is claimed is:

1. An immersive projection system, comprising:
   an enclosure having a perimeter wall and a top portion; and
   a plurality of projectors suspended outside the enclosure at the top portion of the enclosure, wherein the projectors are configured to project imagery through respective openings in the perimeter wall and onto an inside surface of the perimeter wall. such that the imagery forms a continuous scene representation completely surrounding a center portion of the enclosure;
   wherein each of the plurality of projectors is oriented such that its optical axis is oblique to the surface of the enclosure at the location of the respective projector.

2. The immersive projection system of claim 1, wherein the enclosure is a collapsible dome.

3. The immersive projection system of claim 2, wherein when deployed, the dome approximately defines a portion of a sphere.

4. The immersive projection system of claim 2, wherein the shape of the enclosure is maintained by positive air pressure within the collapsible dome, such that the perimeter wall defines the dome shape.

5. The immersive projection system of claim 2, wherein the shape of the enclosure is maintained in part by negative air pressure within the enclosure as compared with the atmosphere outside the enclosure.

6. The immersive projection system of claim 1, wherein the plurality of projectors includes no more than five projectors.

7. The immersive projection system of claim 1, wherein:
   each of the plurality of projectors is aimed inward toward a central axis; and
   light emanated by the projectors falls directly onto the perimeter wall.

8. The immersive projection system of claim 1, wherein:
each projector aimed inward toward a central axis;
the immersive projection system further comprises one or more mirrors suspended in the upper portion of the enclosure at the central axis; and
light emanated by each projector reflects from one of the one or more mirrors before being cast onto the perimeter wall.

9. The immersive projection system of claim 8, wherein the one or more mirrors consist of only a single spherical mirror.

10. The immersive projection system of claim 1, further comprising a mounting frame onto which the plurality of projectors is mounted, the mounting frame holding the plurality of projectors in fixed spatial relationship.

11. The immersive projection system of claim 10, further comprising one or more mirrors mounted to the mounting frame, wherein light emanated by each projector reflects from one of the one or more mirrors before being cast onto the perimeter wall and wherein the mounting frame holds the plurality of projectors and the one or more mirrors in fixed spatial relationship.

12. The immersive projection system of claim 1, wherein the perimeter wall is reflective for viewing the projected imagery from inside the enclosure, the system further comprising an access and egress port providing access to the interior of the enclosure by a user of the system.

13. The immersive projection system, comprising:
an enclosure having a perimeter wall and a top portion; and
a plurality of projectors suspended outside the enclosure at the top portion of the enclosure, each projector aimed inward toward a central axis, wherein the projectors are configured to project imagery through openings in the perimeter wall and onto an inside surface of the perimeter wall; and
a plurality of mirrors suspended in the upper portion of the enclosure at the central axis, the plurality of mirrors comprising one and only one convex mirror face for each projector;
wherein light emanated by each projector reflects from one of the plurality of mirrors before being cast onto the perimeter wall.

14. The immersive projection system of claim 13, wherein each convex mirror face defines a segment of a sphere.

15. The immersive projection system of claim 13, wherein each convex mirror face is aspheric.

16. The immersive projection system of claim 14, further comprising:
an enclosure having a perimeter wall and a top portion;
a set of projectors suspended outside the enclosure at the top portion of the enclosure, wherein the projectors are configured to project imagery through openings in the perimeter wall and onto an inside surface of the perimeter wall
a mounting frame onto which the plurality of projectors is mounted, and mounting frame holding the plurality of projectors in fixed spatial relationship; and
a movable gantry to which the mounting frame is attached, the gantry configured to raise the mounting frame from a position facilitating assembly of the system to position at the upper portion of the enclosure.

17. An immersive projection system, comprising:
one or more projectors
at least two towers;
a gantry suspended between the two towers and movable vertically;
a mounting frame affixed to the gantry, the mounting frame comprising mounting points for mounting one or more projectors; and
and enclosure having a perimeter wall, the enclosure being collapsible;
wherein an upper portion of the perimeter wall is configured to be raised by the raising of the gantry.

18. The immersive projection system of claim 17, further comprising one or more mirrors fixed to the mounting frame such that the one or more projectors mounted to the mounting points aim toward the one or more mirrors.

19. The immersive projection system of claim 17, wherein the gantry is movable from a position facilitating assembly of the system to a position at the upper portion of the enclosure.

20. A method of assembling a projection system, the method comprising:
erecting two towers;
connecting a movable gantry between the two towers;
positioning the movable gantry at a height that facilitates assembly of the system;
affixing a mounting frame to the movable gantry, the mounting frame comprising mounting points for one or more projectors;
mounting one or more projectors to the mounting points;
connecting an upper portion of a perimeter wall of an enclosure to the mounting frame such that each of the one or more projectors projects imagery through a respective opening in the perimeter wall, and such that raising the gantry raises the upper portion of the perimeter wall to its working height; and
raising the gantry to its working height.

21. A method of assembling a projection system, the method comprising:
erecting two tower;
connecting a movable gantry between the two towers;
positioning the movable gantry at a height that facilitates assembly of the system;
affixing a mounting frame to the moveable gantry, the mounting frame comprising mounting points for one or more projectors;
mounting one or more projectors to the mounting points;
connecting an upper portion of a perimeter wall of an enclosure to the mounting frame such that each of the one or more projectors imagery through a respective opening in the perimeter wall, and such that raising the gantry raises the upper portion of the perimeter wall to its working height;
raising the gantry to its working height; and
pressurizing the enclosure.

* * * * *

UNITED STATES PATENT AND TRADEMARK OFFICE
CERTIFICATE OF CORRECTION

PATENT NO. : 9,140,965 B2  Page 1 of 1
APPLICATION NO. : 13/682018
DATED : September 22, 2015
INVENTOR(S) : Dennis et al.

It is certified that error appears in the above-identified patent and that said Letters Patent is hereby corrected as shown below:

In the Claims:

Column 7, line 2, Claim 8: after "each" please delete "projector" and insert --of the plurality of projectors is--

Column 7, line 27, Claim 13: delete "The" and insert --An--

Column 7, line 46, Claim 16: delete "The" and insert --An--

Column 7, line 46, Claim 16: insert a --,-- after "system" and delete "of claim 14, further"

Column 7, line 53, Claim 16: insert a --;-- after "wall"

Column 7, line 55, Claim 16: delete "and" and insert --the--

Column 8, line 9, Claim 17: insert --the-- in front of "one"

Column 8, line 11, Claim 17: delete "and" and insert --an--

Column 8, line 41, Claim 21: delete "tower" and insert --towers--

Column 8, line 45, Claim 21: delete "moveable" and insert --movable--

Column 8, line 48, Claim 21: insert --projects-- after "projectors"

Signed and Sealed this
Thirty-first Day of May, 2016

Michelle K. Lee
*Director of the United States Patent and Trademark Office*